US008806453B1

(12) United States Patent
Bodkin et al.

(10) Patent No.: US 8,806,453 B1
(45) Date of Patent: Aug. 12, 2014

(54) INTEGRATING DISPARATE PROGRAMMING LANGUAGES TO FORM A NEW PROGRAMMING LANGUAGE

(75) Inventors: Michael A. Bodkin, Orlando, FL (US); William J. Headrick, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 62 days.

(21) Appl. No.: 13/479,478

(22) Filed: May 24, 2012

Related U.S. Application Data

(60) Provisional application No. 61/535,178, filed on Sep. 15, 2011.

(51) Int. Cl.
*G06F 9/44* (2006.01)
*G06F 9/45* (2006.01)

(52) U.S. Cl.
USPC ............................ 717/137; 717/114; 717/136

(58) Field of Classification Search
None
See application file for complete search history.

(56) References Cited

U.S. PATENT DOCUMENTS

| | | | | | |
|---|---|---|---|---|---|
| 4,894,829 | A | * | 1/1990 | Monie et al. | 717/109 |
| 6,775,680 | B2 | * | 8/2004 | Ehrman et al. | 717/137 |
| 6,799,718 | B2 | * | 10/2004 | Chan et al. | 717/137 |
| 7,240,338 | B1 | * | 7/2007 | Bell et al. | 717/137 |
| 7,424,704 | B2 | * | 9/2008 | Orton et al. | 717/136 |
| 7,447,624 | B2 | * | 11/2008 | Fuhrmann | 717/136 |
| 2002/0046294 | A1 | * | 4/2002 | Brodsky et al. | 709/246 |
| 2002/0166110 | A1 | * | 11/2002 | Powell | 717/114 |
| 2003/0028364 | A1 | * | 2/2003 | Chan et al. | 704/1 |
| 2003/0126559 | A1 | * | 7/2003 | Fuhrmann | 717/137 |
| 2005/0066317 | A1 | * | 3/2005 | Alda et al. | 717/136 |
| 2006/0031820 | A1 | * | 2/2006 | Li | 717/137 |
| 2006/0074625 | A1 | * | 4/2006 | Maeda | 704/8 |
| 2006/0225054 | A1 | * | 10/2006 | Sentovich et al. | 717/140 |
| 2007/0044066 | A1 | * | 2/2007 | Meijer et al. | 717/114 |
| 2008/0016499 | A1 | * | 1/2008 | Jones et al. | 717/124 |
| 2009/0271771 | A1 | * | 10/2009 | Fallows | 717/137 |
| 2011/0145788 | A1 | * | 6/2011 | Xu et al. | 717/121 |

OTHER PUBLICATIONS

Chadwick et al., "Algorithms for Traversal-Based Generic Programming", 2010 ACM, WGP'10, Sep. 26, Baltimore, Maryland, USA, pp. 61-72; <http://dl.acm.org/results.cfm?h=1&source_query=&&cfid=310481682&cftoken=82252239>.*
Bongsue Suh, "Dev. and Appl. of an Integrated Course for Procedural and OO Programming Languages in EE", 2007 IEEE, pp. 1-4; <http://ieeexplore.ieee.org/stamp/stamp.jsp?tp=&arnumber=4428850>.*
Trudel et al., "Really Automatic Scalable Object-Oriented Reengineering", 2013 Springer-Verlag Berlin Heidelberg, ECOOP 2013, pp. 477-501; <http://link.springer.com/chapter/10.1007%2F978-3-642-39038-8_20#page-1>.*

* cited by examiner

*Primary Examiner* — Thuy Dao
*Assistant Examiner* — Ben C Wang
(74) *Attorney, Agent, or Firm* — Withrow & Terranova, PLLC

(57) ABSTRACT

Methods, apparatus, and computer-readable media for integrating two programming languages into a new programming language are disclosed. A plurality of programming statements are received, some of the plurality of programming statements having a first syntax representative of a first programming language and some of the plurality of programming statements having a second syntax representative of a second programming language. The some of the plurality of programming statements having the first syntax representative of the first programming language are translated into new programming statements in the second programming language. A source file is generated that comprises the some of the plurality of programming statements written in the second programming language and the new programming statements.

18 Claims, 7 Drawing Sheets

```
// TESTAPP.ATC : Defines the entry point of the console application.
// include "stdafx.h"
include "ATLAS_API.h"

int_tmain(int argc, _TCHAR* argv[ ])
{
        bool test_passed = false;

printf("Performing test.\n");
10      APPLY, AC SIGNAL USING 'AWFG-A-AC'
        VOLTAGE 2.0 V                                    $

20      EXECUTE "TEST EXTENTION"                         $ if(test_passed)
        {
                printf("Test PASSED.\n");
        }
        else
        {
                printf("Test FAILED.\n");
        } return 0;
}
```

*FIG. 4*

INTEGRATING DISPARATE PROGRAMMING LANGUAGES TO FORM A NEW PROGRAMMING LANGUAGE

RELATED APPLICATIONS

This application claims the benefit of U.S. provisional patent application No. 61/535,178, filed Sep. 15, 2011, the disclosure of which is hereby incorporated herein by reference in its entirety.

FIELD OF THE DISCLOSURE

The present disclosure relates to programming languages, and in particular to integrating two disparate programming languages into a new programming language.

BACKGROUND

A substantial amount of technology today is implemented in software. A developer writes source code statements in a particular programming language to accomplish a desired function and stores the source code statements, sometimes referred to herein as programming statements, in a file. A compiler that understands the syntax of the particular programming language may read the file, may ensure each programming statement complies with the syntax, and may compile the source code into an object code file that contains binary instructions that are executable by a processor to implement the desired functionality. There may be thousands of different programming languages, each of which may have its own syntax, or set of rules, that define the respective language at the source code level.

Due to the importance and prevalence of software development, software development tools have become increasingly sophisticated. Much of software development today is done with the help of an integrated development environment (IDE) that helps reduce software development time by providing time-saving features for the developer. For example, an IDE may provide real-time verification that a developer's programming statements comply with the syntax of the respective programming language, and provide auto-completion as the IDE recognizes programming constructs, to name just a few advantages of an IDE.

There are different types of programming languages. Traditionally, programming languages were procedural. Examples of procedural type programming languages are Fortran, Cobol and Pascal. Over time there has been a paradigm shift to object-oriented (OO) programming. Examples of OO type programming languages are Java, C++ and C#. An OO program will usually contain different types of objects, each type corresponding to a particular kind of complex data to be managed or to a real-world object or concept such as a bank account, a hockey player, or a bulldozer. Modern OO programming languages in many ways offer a substantial advancement in programming flexibility, efficiency, supportability and the like. Accordingly, OO programming languages are extremely popular and may now constitute the vast majority of new software projects.

Consequently, software developers increasingly may be taught OO programming techniques only, and may be unfamiliar with the programming paradigm associated with conventional procedural programming languages. However, from a practical standpoint, thousands or millions of programs that have been written using procedural programming languages continue not only to operate, but operate well, and there is little motivation to rewrite such software using an OO programming language. Yet, as companies hire new software developers out of college, increasing numbers of such developers may be unfamiliar with procedural programming languages, making it difficult for such developers to enhance or even maintain such programs.

Furthermore, many programming languages are highly function specific, with compilers and languages created to focus on a particular problem, and they accomplish that function very well. Even the general advantages brought by newer OO programming languages, may not compensate for the ease with which a special-purpose programming language can accomplish a particular task. However, it would be beneficial to such procedural programming languages if they could leverage the advantages of modern OO programming languages. Accordingly, there is a need to integrate programming languages of different types, such as a special-purpose procedural programming language with an OO programming language, to enable the best of both programming languages to be leveraged in the development of programs.

SUMMARY

The present disclosure relates to integrating two disparate types of programming languages to form a new programming language that can offer the benefits of each of the two disparate types of programming languages. In one embodiment, a plurality of programming statements is received; some of the programming statements have a first syntax representative of a first programming language and some of the programming statements have a second syntax representative of a second programming language. The programming statements having the first syntax representative of the first programming language are translated into new programming statements in the second programming language. A source file is generated that comprises the new programming statements and the second programming statements. An executable file is generated based on the source file.

In one embodiment, an integrated development environment (IDE) module presents a user interface window in which a user may enter the programming statements. As the user enters a programming statement, the IDE module determines whether the programming statement is in accordance with the first syntax that defines the first programming language or the second syntax that defines the second programming. The IDE module verifies that the programming syntax complies with at least one of the first and second syntaxes. If the programming statement does comply with at least one of the first and second syntaxes, the IDE module may effect display of the programming statement with a predefined visual characteristic that indicates that the first programming statement complies with the first or second syntaxes. If the programming statement does not comply with either of the first or second syntaxes, the IDE module may effect display of the programming statement with a different predefined visual characteristic that indicates that the first programming statement does not comply with either syntax, and is thus an invalid programming statement.

The programming statements of the first programming language may be intermingled with the programming statements of the second programming language. Thus, as a developer writes the program, the developer may use the programming language that best implements the particular functionality at that point in the program. Variables may be shared between the programming statements of the two programming languages. For example, the developer may write a programming statement in the first programming language that sets the value of a particular variable, which may then be subsequently referenced by a programming statement in the second programming language.

The first programming language may comprise a procedural type programming language that lacks object-oriented (OO) characteristics and the second programming language may comprise an OO type programming language that implements OO characteristics. OO characteristics may include, for example, inheritance, polymorphism and encapsulation.

A translator module may then translate the programming statements that have the first syntax representative of the first programming language into new programming statements in the second programming language, and generate a new source file that includes the new programming statements and the programming statements that have the second syntax representative of the second programming language, but lacks any programming statements in the first programming language. A second programming language compiler may then access the new source file and generate an executable file based on the new source file.

The translator module may load a first language configuration file that identifies the syntax rules of the first programming language, and identifies in the first programming language the programming statements in the second programming language that correspond to particular programming statements in the first programming language. The translator module uses the first language configuration file to translate the programming statements in the first programming language into the new programming statements in the second programming language.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 4 is an exemplary user interface window in which programming statements in the first programming language and programming statements in the second programming language may be entered by a user and received by an integrated development environment (IDE) module;

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

The present disclosure relates to integrating two disparate types of programming languages to form a new programming language that may offer the benefits of each of the two disparate types of programming languages. In a particular embodiment, a procedural programming language that lacks object-oriented (OO) features, such as polymorphism, inheritance and encapsulation, may be integrated into an OO language, such as C++ or C#, for example, such that a software developer may leverage the benefits of the procedural programming language with those of the OO programming language.

While much software development may be conducted using OO programming languages, there exist millions of legacy programs written in other types of programming languages, such as procedural programming languages, that lack OO characteristics. Such programs may operate well and thus there may be little incentive to re-write these programs in an OO language. Additionally, some of such procedural programming languages may be special-purpose programming languages that were developed to implement relatively specific functionality through special programming language constructs. Even new OO programming languages may well lack the advantages of special-purpose programming languages in the context of the particular environment for which the special-purpose programming languages were created. The present disclosure provides mechanisms for integrating two such programming languages into a new programming language so that the developer may program using the best features of both the procedural programming language and the OO programming language in a highly-intuitive and modern, integrated development environment (IDE).

For purposes of illustration, the embodiments of the present disclosure will be discussed herein in the context of a relatively special purpose procedural programming language known as Abbreviated Test Language for All Systems (ATLAS), which is a programming language for automatic testing of avionics equipment, and in the context of the C++ OO programming language, but it should be apparent that the present disclosure is not limited to any particular procedural programming language or OO programming language.

Figure 1:
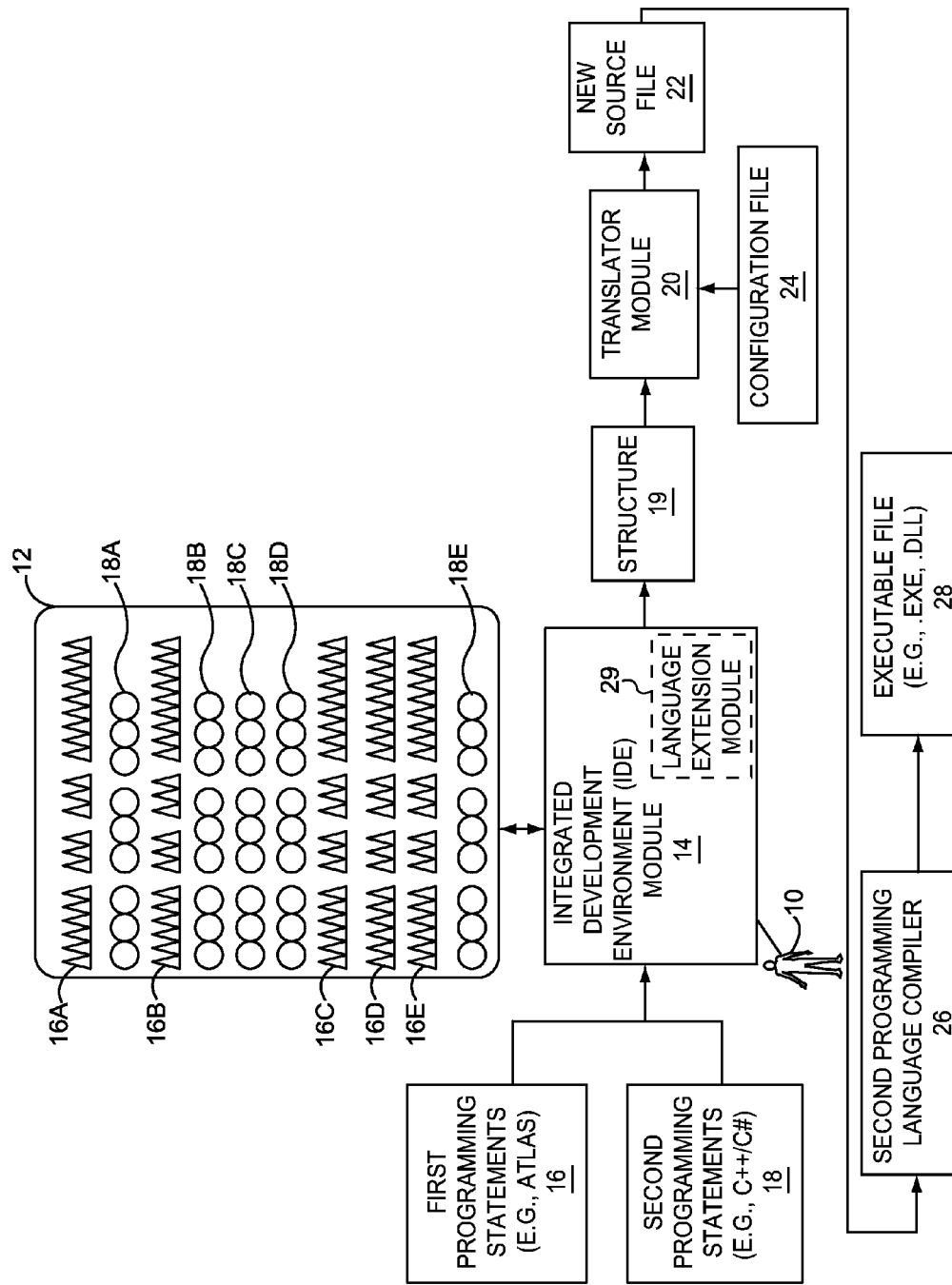
FIG. 1 is a block diagram illustrating various elements suitable for implementing aspects of the present disclosure according to one embodiment.

FIG. 1 is a block diagram illustrating various elements suitable for implementing aspects of the present disclosure according to one embodiment. A user 10, such as a software developer, enters programming statements into a user interface window 12 of an integrated development environment (IDE) module 14. In other embodiments, the user 10 may comprise an automated entity. First programming statements 16, 16A-16E may comprise, for example, programming statements of a first procedural type programming language, such as ATLAS, or the like. The first programming language has an associated first syntax, or set of rules, that defines the first programming language at the source code level. The first syntax comprises the set of rules that define the combinations of symbols and tokens that are considered to be correctly structured programs in the first programming language.

Second programming statements 18, 18A-18E may comprise, for example, programming statements of an OO type programming language, such as C++, C#, or the like. The second programming language has an associated second syntax, or set of rules, that defines the second programming language at the source code level. The first programming statements 16 may all be entered into the user interface window 12 by the user 10, or some may be initially contained in a file and loaded into the user interface window 12 by the IDE module 14 upon direction by the user 10, who may then enter additional first programming statements 16 and second programming statements 18 into the user interface window 12. The use of ordinals herein such as first, second, or third, prior to an element, is simply for distinguishing between what might otherwise be substantially similarly named elements, and does not indicate a priority, an importance, or other characteristic unless specifically discussed. For example, the user of the ordinals "first" and "second" in the phrases "first programming statement" and "second programming statement" is simply to distinguish the two types of programming statements.

As the user 10 enters a programming statement in the user interface window 12, the IDE module 14 verifies that the programming statement complies with either the first syntax or the second syntax. The IDE module 14 may, if the programming statement complies with one of the respective syntaxes, effect presentation of the programming statement in the user interface window 12 with a predefined visual characteristic that indicates that the programming statement complies with the respective syntax. For example, a particular color may indicate to the user 10 that the programming statement complies with one of the two syntaxes.

The IDE module 14 may, if the programming statement does not comply with either syntax, effect presentation of the programming statement in the user interface window 12 with a different predefined visual characteristic that indicates that the programming statement does not comply with either syntax. For example, one or more tokens in the programming statement may be colored red to indicate to the user 10 that the programming statement, or particular tokens that form the programming statement, do not comply with either syntax. Notably, the IDE module 14, on a programming statement by programming statement basis, verifies that each programming statement complies with either the first or the second syntax. Thus, even though any particular programming statement may fail to comply with one syntax, so long as the programming statement complies with the other syntax, the IDE module 14 will not visually distinguish the programming statement as being invalid. Accordingly, the user 10 may, on a statement by statement basis, enter programming statements in either the first programming language or the second programming language into the user interface window 12, based on the programming language that best accomplishes the desired functionality. The IDE module 14 may also provide features that simplify software development, such as auto-completion of tokens as the IDE module 14 recognizes the user-entry of a particular token of the respective syntax.

After the user 10 completes the entry of the first and second programming statements 16 and 18 into the user interface window 12, and the IDE module 14 verifies that each programming statement complies with either the first or the second syntax, the user 10 may direct the IDE module 14 to save the first and second programming statements into a structure 19, such as a file. Alternatively, the structure 19 may be a data structure, such as a tree structure, that identifies the components of the first and second programming statements 16 and 18. A translator module 20 reads the structure 19, and translates or otherwise converts the first programming statements 16 into new programming statements in the second programming language, and generates a new source file 22 that contains the new programming statements and the second programming statements 18. In one embodiment, the translator module 20 may input a first language configuration file 24 that identifies syntax rules and bindings associated with the first programming language which facilitates the translation of the first programming statements 16 into new programming statements in the second programming language.

Because all the programming statements in the new source file 22 are in the second programming language, a second programming language compiler 26 can compile the new source file 22 into an executable file 28 that contains the binary instructions that, when executed on a processor, implement the functionality desired by the user 10. Non-limiting examples of executable files 28 are files with .exe or .dll suffixes.

Figure 2:
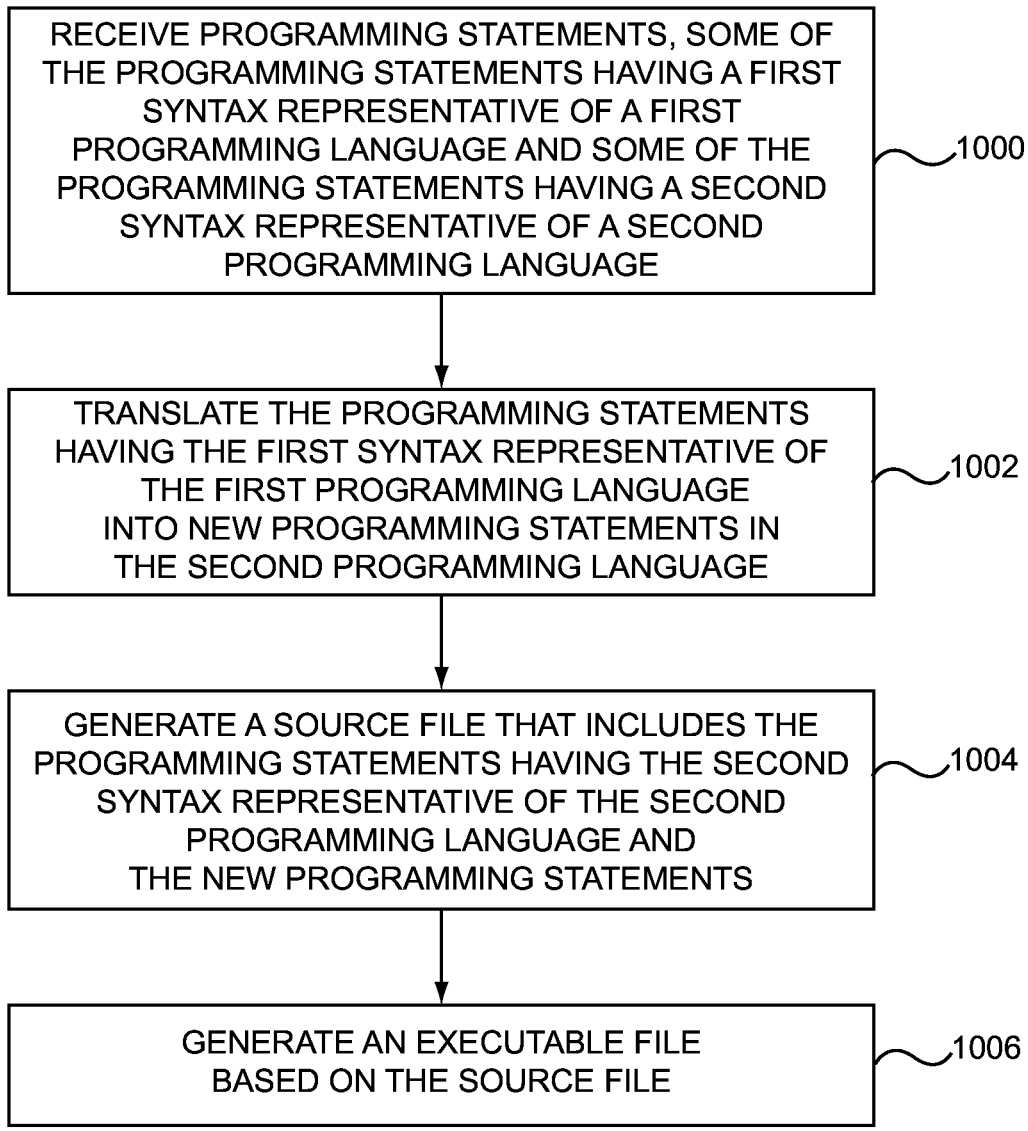
FIG. 2 is a high-level flowchart of an exemplary process for integrating a first programming language with a second programming language to form a new programming language, according to one embodiment.

FIG. 2 is a flowchart of an exemplary process for integrating a first programming language with a second programming language to form a new programming language, according to one embodiment, and will be discussed in conjunction with FIG. 1. The IDE module 14 receives a plurality of programming statements, the first programming statements 16 having a first syntax representative of the first programming language, and the second programming statements 18 having a second syntax representative of the second programming language (block 1000). The translator module 20 translates the first programming statements 16 into new programming statements in the second programming language (block 1002). The translator module 20 generates the new source file 22 that includes the second programming statements 18 and the new programming statements (block 1004). Optionally, the second programming language compiler 26 may generate the executable file 28 based on the new source file 22 (block 1006).

Figure 3:
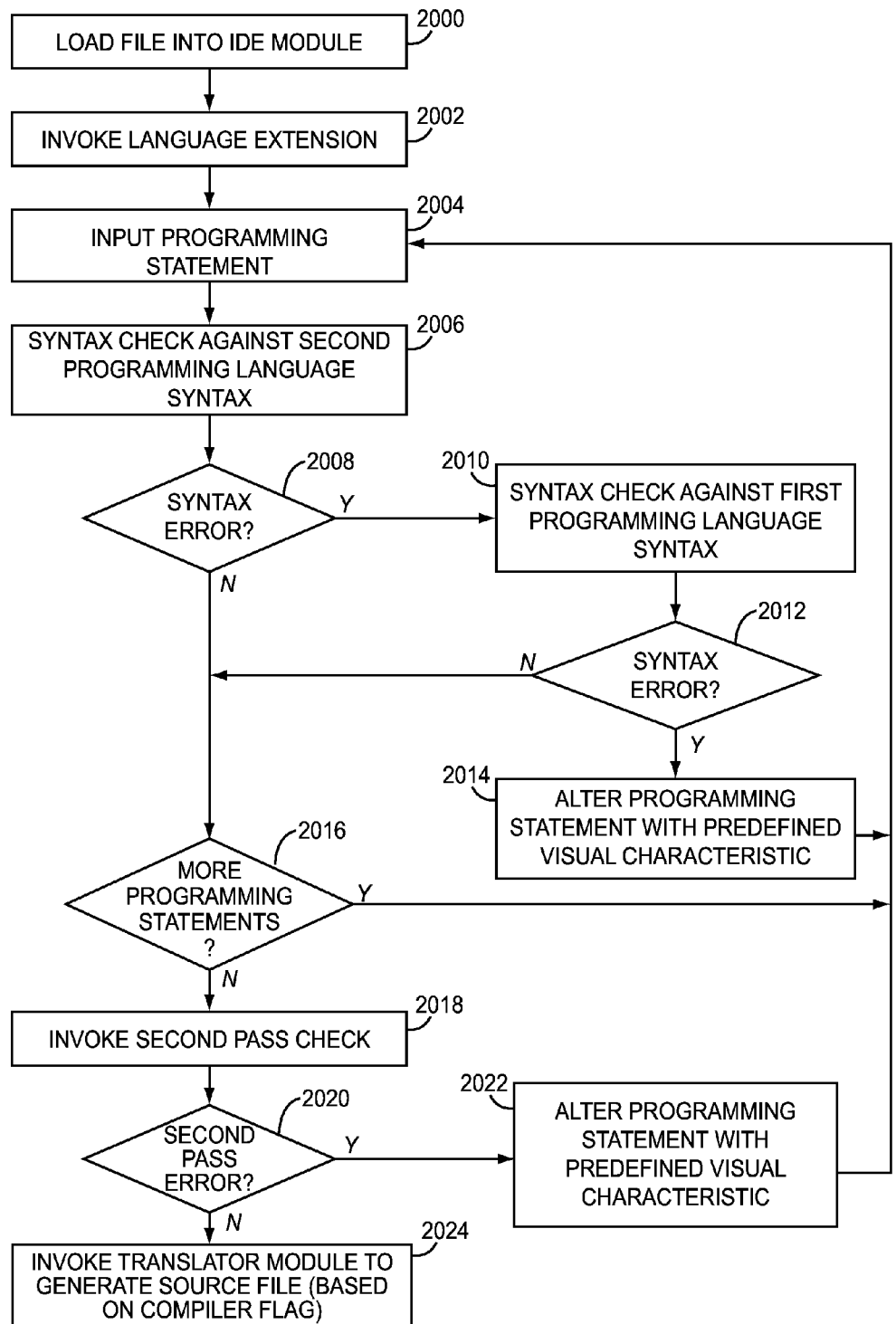
FIG. 3 is a more detailed flowchart of an exemplary process for integrating a first programming language with a second programming language to form a new programming language, according to another embodiment.

FIG. 3 is a more detailed flowchart of an exemplary process for integrating a first programming language with a second programming language to form a new programming language, according to another embodiment. FIG. 3 will also be discussed in conjunction with FIG. 1. In this embodiment, the IDE module 14 comprises an extensible IDE, such as the Microsoft® Visual Studio® IDE, which includes functionality suitable for syntax checking, auto-completion and other features for the OO type second programming language, such as C++ or C#. Functionality associated with the syntax checking, auto-completion and other features of the first programming language in such embodiment may be implemented as a Managed Extensibility Framework (MEF) extension, or component, which is integrated into the IDE module 14 in accordance with the MEF architecture.

In the context of the Microsoft® Visual Studio® IDE, the IDE module 14 includes a language extension module 29 that comprises a language parser that is capable of parsing a programming statement into tokens. The language extension module 29 is also capable of syntax checking the tokens in accordance with the first syntax to determine whether the programming statement has been written in accordance with the first programming language. In one embodiment, software tools, such as the Boost Spirit Qi and Boost Spirit Karma tools, available from Boost.org, may be useful in the generation of software instructions that implement aspects of the parsing and syntaxing functionality in the language extension module 29.

Assume that the user 10 directs the IDE module 14 to load a file into the IDE module 14 (block 2000). For example, the user 10 may "open" a file that contains the first programming statements 16 and the second programming statements 18. The IDE module 14 may then display the programming statements 16, 18 contained in the file in the user interface window 12. The file may have a particular file extension, such as, for example, ".ATC", that triggers the IDE module 14 to invoke the language extension module 29 (block 2002). The IDE module 14 then begins to sequentially process the programming statements 16, 18 contained in the file. For example, the IDE module 14 initially inputs the first programming statement 16A (block 2004). The IDE module 14 syntax checks the first programming statement 16A against the second programming language syntax, such as the C++ programming language syntax (block 2006). The IDE module 14 determines that there is a syntax error because the first programming statement 16A has a first syntax representative of the first programming language and not the second programming language (block 2008).

In this embodiment, the language extension module 29 works in conjunction with the IDE module 14 in a manner that is transparent to the user 10. Once the language extension module 29 is invoked by the IDE module 14, the IDE module 14 passes the language extension module 29 programming statements, such as the first programming statement 16A, that do not comply with the second syntax so that it can be determined if such programming statements comply with the first syntax. The language extension module 29 then syntax checks the first programming statement 16A against the first programming language syntax (block 2010).

If the first programming statement 16A does not comply with the first syntax, the language extension module 29 may alter the first programming statement 16A with a predefined visual characteristic to indicate to the user 10 the particular token in the first programming statement 16A that fails to comply with the first syntax (blocks 2012, 2014). The language extension module 29 may return an error code to the IDE module 14 that indicates a syntax error. The first programming statement 16A may then be displayed in the user interface window 12 with the predefined visual characteristic. The IDE module 14 may then input the second programming statement 18A.

If the language extension module 29 determines that the first programming statement 16A is in accordance with the first syntax, then the language extension module 29 returns a code to the IDE module 14 that indicates that the first programming statement 16A does not contain a syntax error. The IDE module 14 may then determine if additional programming statements 16, 18 need to be checked for syntax, as discussed above with regard to the first programming statement 16A (block 2016). If so, then the IDE module 14 inputs the next programming statement 16, 18 (block 2004). The IDE module 14 may continue to expect additional programming statements 16, 18 until the user 10 indicates that the user 10 is finished. For example, the user 10 may actuate a button or otherwise make a selection that indicates to the IDE module 14 that no additional programming statements 16, 18 will be entered by the user 10.

The language extension module 29 may then perform a second pass check on the first programming statements 16 to ensure that any parameter values contained in the first programming statements 16 are within acceptable ranges (block 2018). For example, if the first programming statement 16A comprises the programming statement "APPLY CURRENT 30 A," the language extension module 29 may first determine that the combination of the tokens "APPLY," "CURRENT" AND "30 A" is a proper programming statement in accordance with the first syntax, as discussed above with respect to blocks 2010-2012. However, during the second pass check, the language extension module 29 may verify that the identified "CURRENT" of "30 A" is within a suitable range of currents (block 2018). In particular, the language extension module 29 may access a table or other structure that indicates a valid range of currents to be 1-3 amps. Since the first programming statement 16A identifies a value of 30 amps, which exceeds the permitted range, the language extension module 29 may then alter the first programming statement 16A with a predefined visual characteristic to indicate to the user 10 that the particular parameter value "30 A" is invalid (blocks 2020, 2022). While shown as a separate pass in FIG. 3, it will be appreciated that such processing could also occur at other points in the process, such as in conjunction with the initial syntax checking described in blocks 2010-2012.

If each of the programming statements 16, 18 comply with either the first syntax or the second syntax, then the translator module 20 may be invoked to generate the new source file 22, as discussed above with regard to FIG. 2 (block 2024). In particular, the translator module 20 translates the first programming statements 16 into new programming statements in the second programming language, and generates the new source file 22 that includes the second programming statements 18 and the new programming statements. The second programming language compiler 26 then generates the executable file 28 based on the new source file 22. In one embodiment, the translator module 20 may be implemented, at least in part, with the aid of third party tools, such as the Boost Spirit Qi and Karma tools, available from Boost.org, discussed previously.

FIG. 4 is an exemplary user interface window 12 in which programming statements in the first programming language and programming statements in the second programming language may be entered by the user 10 and received by the IDE module 14. In this example, the user 10 has entered a number of programming statements in both the first programming language and the second programming language into the user interface window 12. For example, first programming statements 16A and 16B may comprise programming statements that have a first syntax representative of the first programming language. Second programming statements 18A, 18B, and 18C may comprise programming statements that have a second syntax representative of the second programming language. As the user 10, for example, entered the second programming statement 18A, the IDE module 14 determined that the user 10 was entering the second programming statement 18A in accordance with the second programming language, and accordingly verified that the second programming statement 18A complied with the second syntax. Similarly, as the user 10, for example, entered the first programming statement 16A, the IDE module 14 determined that the user 10 was entering the first programming statement 16A in accordance with the first programming language, and accordingly verified that the first programming statement 16A complied with the first syntax. Had either the second programming statement 18A or the first programming statement 16A not complied with the second syntax or with the first syntax, respectively, the IDE module 14 could effect presentation of the respective programming statement with a predefined visual characteristic that indicates that the programming statement does not comply with either syntax to notify the user 10 that the programming statement was invalid.

For example, with regard to the first programming statement 16A, the IDE module 14 may recognize the USING token 30 as being a valid token in the first syntax. Accordingly, even though the USING token 30 is not a valid token in the second syntax, because the IDE module 14 recognized that the first programming statement 16A was being entered in accordance with the first syntax, the IDE module 14 displays the USING token 30 with a predefined visual characteristic that indicates that the USING token 30 complies with the first syntax. The programming statements in the user interface window 12 may be stored in a file at the direction of the user 10. In one embodiment, where, as discussed above, the IDE module 14 comprises an extensible IDE module and the syntax checking and other features associated with the first programming language are implemented via an extension, or component, a filetype of the file 32 (i.e., in this example ".atc") may trigger the IDE module 14 to load the appropriate extension. The user interface window 12 is merely one exemplary type of user interface window, and the present disclosure is not limited to any particular type of user interface window.

Figure 5:
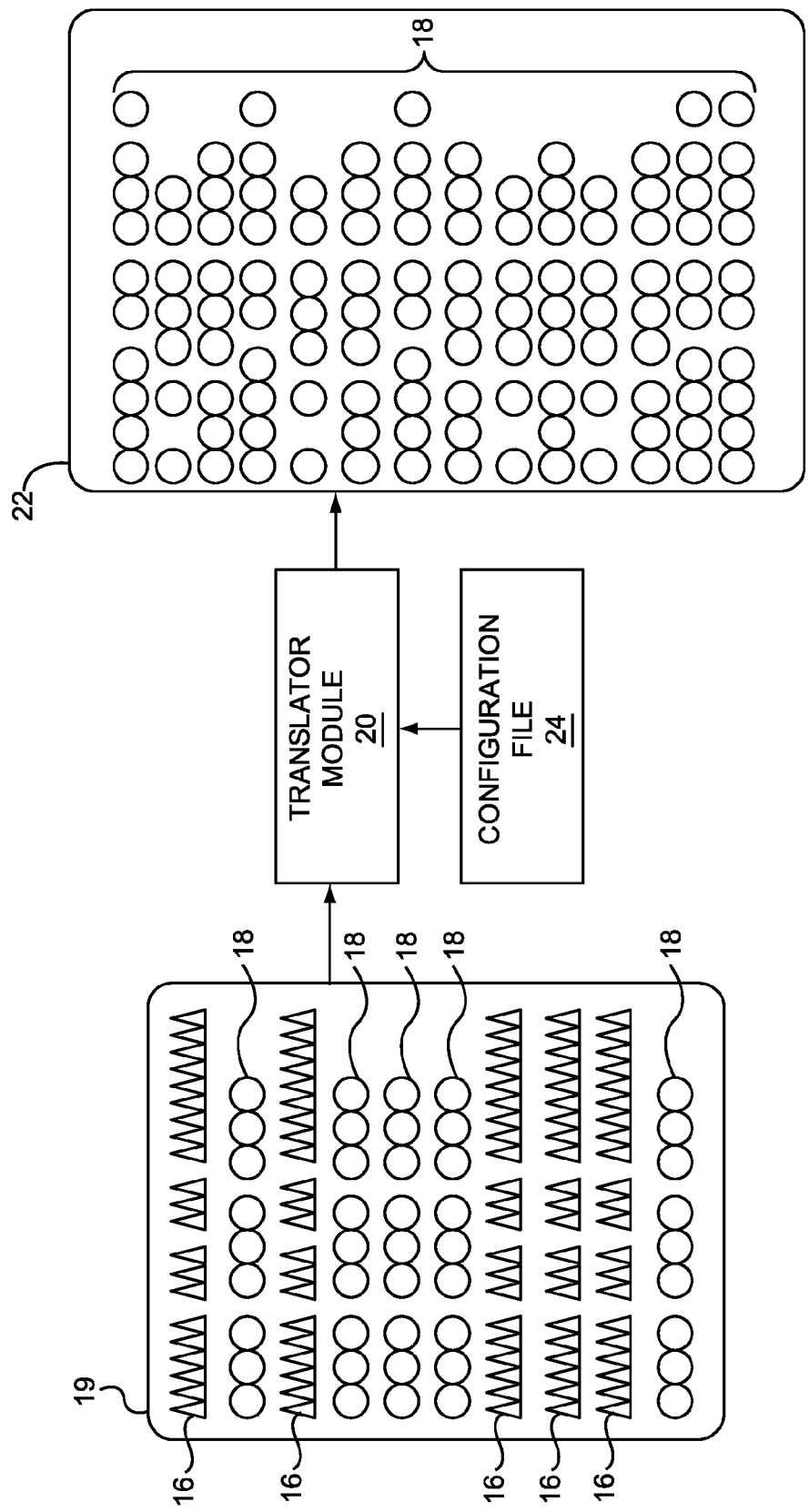
FIG. 5 is a diagram illustrating aspects of the translation, or conversion, of programming statements that have a first syntax representative of the first programming language into new programming statements in the second programming language according to one embodiment.

FIG. 5 is a diagram illustrating aspects of the translation, or conversion, of programming statements that have a first syntax representative of the first programming language into new programming statements in the second programming language according to one embodiment. The translator module 20 may initially load the configuration file 24, which includes the rules that define the first syntax of the first programming language, and bindings that define how programming statements in the first programming language correspond to particular programming statements in the second programming language. The translator module 20 may also include parsing technology, such as the Spirit parsing library, available from Boost.org, to parse the first programming statements 16. The translator module 20 may read the structure 19 and may identify the first programming statements 16. The translator module 20 may use the rules and bindings loaded from the configuration file 24 to generate new programming statements in the second programming language. There may or may not be a one-to-one correlation between the number of first programming statements 16 in the first programming language and the corresponding number of new programming statements in the second programming language. Thus, a single first programming statement 16 in the first programming language may translate to multiple new programming statements in the second programming language, or, conversely, multiple programming statements in the first programming language may translate to a single new programming statement in the second programming language 18.

The translator module 20 may generate the new source file 22 which may contain the new programming statements and the second programming statements 18, so that all programming statements in the new source file 22 are in accordance with the second programming language. This allows a conventional compiler that is capable of compiling programming statements in the second programming language to generate an executable file suitable for implementing the desired functionality, even though the user 10 used, at least in part, programming statements in the first programming language to implement such functionality.

Another advantage of the present disclosure is the ability to integrate into a legacy programming language, such as the first programming language, which may have been developed long before modern programming techniques and architectures were implemented, such modern techniques and architectures that are available via the second programming language. For purposes of illustration, such features will be discussed in conjunction with an embodiment where the first programming language comprises the Abbreviated Test Language for All Systems (ATLAS) testing language, and the second programming language comprises C++, but this is merely exemplary and the advantages discussed herein may be applicable to a large number of different types of first and second programming languages.

ATLAS is a relatively special purpose procedural type programming language used to test avionics equipment. ATLAS contains features, such as signal definition constructs, that allow an ATLAS developer to easily define electrical signals for sending to a unit under test (UUT), which are not easily implemented in other programming languages. There are a substantial number of ATLAS programs that have been written, debugged, and used over many, many years and thus industry has a substantial investment in such programs. However, ATLAS was developed prior to now common programming architectures and constructs, such as multi-core processors which enable concurrent multi-threaded programs to execute more efficiently, object-oriented programming techniques that facilitate a more common OO paradigm, and the like. In one embodiment, the integration of the ATLAS programming language as the first programming language with C++ as the second programming language melds the best of both programming languages into a new testing programming language.

As an example, prior to the present disclosure, for an ATLAS developer to generate a parallel thread to leverage a now common multi-core processor, the ATLAS developer could generate a non-ATLAS module (NAM). In general, the development of NAMs is a costly and error-prone process that may lead to, for example, memory leaks and run-time crashes. By integrating ATLAS with a modern OO language, accomplishing such a task is greatly simplified. For example, if a developer desired to generate Java Script Objects Notation (JSON) for a backend analytical tool, the developer need only call the .NET DataContractJsonSerializer, or similar construct, depending on the particular second programming language and development environment.

Figure 6:
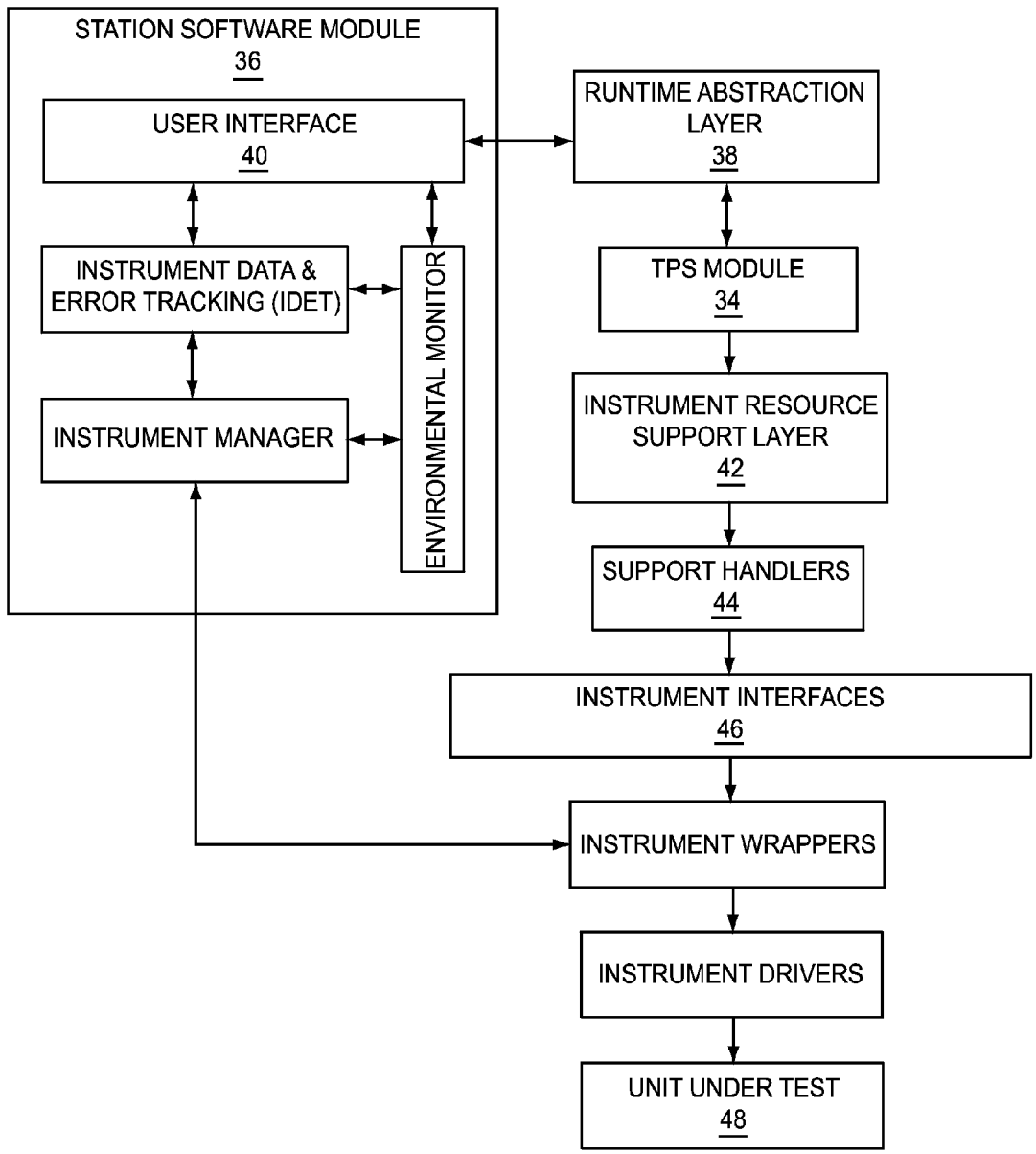
FIG. 6 is a block diagram illustrating an exemplary test program set (TPS) module generated in accordance with the present disclosure interacting with an exemplary testing system, according to one embodiment.

FIG. 6 is a block diagram illustrating an exemplary test program set (TPS) module 34 generated in accordance with the present disclosure interacting with an exemplary testing system in an automated test system environment according to one embodiment. In this embodiment, the TPS module 34 has been generated to operate with a station software module 36, which may comprise automated test software, such as, by way of non-limiting example, the Standard Test Operations and Runtime Manager (STORM) system developed by Lockheed Martin Corporation; however, the embodiments are not limited to operating with any particular station software module 36, or indeed, limited to a testing environment. The TPS module 34 is one embodiment of an executable file 28 (FIG. 1) which may be developed by the user 10 using a combination of programming statements in the first programming language and the second programming language.

At some point during the generation of the TPS module 34, additional programming instructions may be automatically included with those entered by the user 10, and/or executable files 28 may be automatically linked to the TPS module 34 which facilitates communications with various processes used in the station software module 36. In particular, the TPS module 34 may include an embedded user interface server (not shown) that communicates with a runtime abstraction layer 38 to allow an operator of the station software module 36 to interact with the TPS module 34 via a user interface 40. The TPS module 34 may also include interfaces to communicate with an instrument resource support layer (IRSL) 42 which converts signal specific characteristics to instrument specific actions, for use with support handlers 44. The support handlers 44 may comprise a front-end to instrument interfaces 46 that may be used to apply or measure a signal using the system's instruments.

In practice, there may be a plurality of different instrument IRSLs 42, each of which may be directed toward different support handlers 44, based on the particular unit under test (UUT) 48. This is because the messages necessary to send or receive signals to one type of UUT 48 may be different from another type of UUT 48, and thus the procedures in the IRSL 42 that are invoked by the TPS module 34 to send signals to one UUT 48 may be different from the procedures in the IRSL 42 that are invoked by the TPS module 34 to send signals to another UUT 48. Consequently, it is not unusual that a TPS module 34 must at least in part be modified in order to implement a different interface in the TPS module 34 to communicate with a different UUT 48, even though the particular tests implemented by both TPS modules 34 may be identical.

Referring now to both FIGS. 1 and 6, in one embodiment, a plurality of translator modules 20 (FIG. 1) may be generated to eliminate the need to manually rewrite a TPS module 34 to be used with different UUTs 48. In particular, a different translator module 20 is generated for each particular type of UUT 48, such that each translator module 20 generates a new source file 22 that contains the appropriate interface to communicate with the IRSL 42 which corresponds to that particular UUT 48. In order to identify the appropriate translator module 20 for a particular UUT 48, the user 10 may provide a translator identifier, such as a compiler directive statement, such as "#UUT1", that precedes the programming statements 16, 18 and that identifies a particular translator module 20. Based on the translator identifier, the particular translator module 20 is invoked, resulting in a new source file 22 that contains the appropriate interface to communicate with the IRSL 42 that corresponds to the particular UUT 48. If the user 10 would then like to run the same tests against a different UUT 48, the user 10 need only change the translator identifier to identify a different translator module 20 that corresponds to the different UUT 48, without any further changes to the programming statements 16, 18. The different translator module 20 generates a new source file 22 that contains the different, appropriate interface to the IRSL 42 that corresponds to the different UUT 48. This greatly simplifies the ability to use a TPS module 34 with many different types of UUTs 48, with little additional effort by the user 10.

Figure 7:
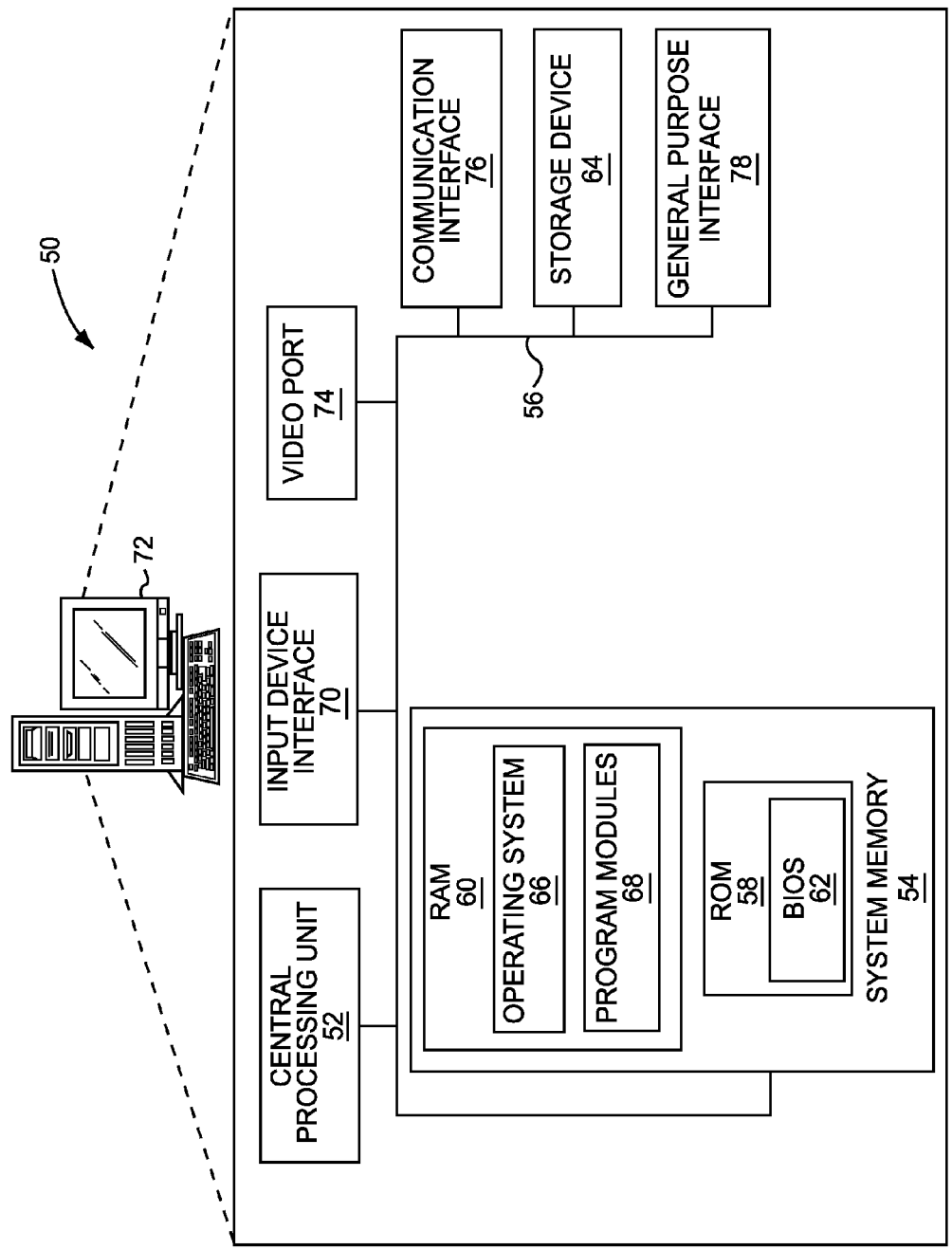
FIG. 7 is a block diagram illustrating an exemplary computing device suitable for implementing aspects of the present disclosure, according to one embodiment.

FIG. 7 is a block diagram of an exemplary computing device 50 in which embodiments disclosed herein may be implemented. The computing device 50 may comprise, for example: a laptop computer; a desktop computer; a workstation; a personal digital assistant; a server; or any other computing device comprising a processor and capable of processing both data and suitable instructions to carry out the functionality described herein. The exemplary computing device 50 may include a processor, such as a central processing unit 52, a system memory 54, and a system bus 56. The system bus 56 provides an interface for system components including, but not limited to, the system memory 54 and the central processing unit 52. The central processing unit 52 can be any of various commercially available or proprietary processors. Dual microprocessors and other multi-processor architectures may also be employed as the central processing unit 52.

The system bus 56 may be any of several types of bus structures that may further interconnect to a memory bus (with or without a memory controller), a peripheral bus, and/or a local bus using any of a variety of commercially available bus architectures. The system memory 54 may include non-volatile memory 58 (e.g., read only memory (ROM), erasable programmable read only memory (EPROM), electrically erasable programmable read only memory (EEPROM), etc.) and/or volatile memory 60 (e.g., random access memory (RAM)). A basic input/output system (BIOS) 62 may be stored in the non-volatile memory 58, and can include the basic routines that help to transfer information between elements within the computing device 50. The volatile memory 60 may also include a high-speed RAM, such as static RAM, for caching data.

The computing device 50 may further include a storage device 64, which may comprise, for example, an internal hard disk drive (HDD) (e.g., enhanced integrated drive electronics (EIDE) or serial advanced technology attachment (SATA)) for storage, flash memory, or the like. The storage device 64 and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as, by way of non-limiting example, Zip disks, magnetic cassettes, flash memory cards, cartridges, and the like, may also be used in the exemplary operating environment, and further, that any such media may contain computer-executable instructions for performing novel methods of the disclosed architecture.

A number of modules may be stored in the storage device 64 and in the volatile memory 60, including an operating system 66 and one or more program modules 68, which may implement the functionality described herein in whole or in part, including, for example, functionality associated with the IDE module 14 (FIG. 1), the translator module 20, the second programming language compiler 26, and other processing and functionality described herein. It is to be appreciated that the embodiments can be implemented with various commercially available operating systems 66 or combinations of operating systems 66.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the central processing unit 52. The central processing unit 52, in conjunction with the program modules 68 in the volatile memory 60, may serve as a controller, or control system, for the computing device 50 that is configured to, or adapted to, implement the functionality described herein.

The user 10 may be able to enter commands and information into the computing device 50 through one or more input devices, such as, for example, a touch-sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 52 through an input device interface 70 that is coupled to the system bus 56, but can be connected by other interfaces (not illustrated) such as a parallel port, an IEEE 1394 serial port, a game port, a universal serial bus (USB) port, an IR interface, etc.

The computing device 50 may drive a separate or integral display device 72, which may also be connected to the system bus 56 via an interface, such as a video port 74. The computing device 50 preferably includes a communication interface 76 that is configured to communicate with a network. The computing device 50 may also include a general purpose interface (GPI) 78 suitable for interfacing with one or more units under test.

While for purposes of illustration the embodiments disclosed herein have discussed the integration of two programming languages, the present disclosure is not limited to any particular number of programming languages, and the principles disclosed herein could be used to integrate any number of programming languages into a new programming language.

Those skilled in the art will recognize improvements and modifications to the embodiments of the present disclosure. All such improvements and modifications are considered within the scope of the concepts disclosed herein and the claims that follow.

What is claimed is:

1. A computer-implemented method for integrating two programming languages, comprising:
receiving, by a computing device, a plurality of source code programming statements, some of the plurality of source code programming statements having a first syntax representative of a first programming language and some of the plurality of source code programming statements having a second syntax representative of a second programming language, wherein the first programming language comprises a procedural programming language that lacks object-oriented characteristics and the second programming language comprises an object-oriented programming language that implements the object-oriented characteristics;
loading a first language configuration file identifying syntax rules of the first programming language and second programming language instructions that correspond to first programming language instructions;
based on the first language configuration file, translating, by the computing device, the some of the plurality of source code programming statements having the first syntax representative of the first programming language into new source code programming statements in the second programming language; and
generating a source file comprising the some of the plurality of source code programming statements having the second syntax representative of the second programming language and the new source code programming statements.

2. The method of claim 1, wherein the some of the plurality of source code programming statements having the first syntax representative of the first programming language are intermingled with the some of the plurality of source code programming statements having the second syntax representative of the second programming language.

3. The method of claim 1, wherein at least one of the plurality of source code programming statements having the first syntax representative of the first programming language references a particular variable and at least one of the plurality of source code programming statements having the second syntax representative of the second programming language references the particular variable.

4. The method of claim 1, wherein receiving the plurality of source code programming statements comprises:

receiving, via user input, a first source code programming statement of the some of the plurality of source code programming statements having the first syntax representative of the first programming language; and
verifying, upon entry of the first source code programming statement, whether the first source code programming statement complies with the first syntax.

5. The method of claim 4, further comprising:
effecting display of the first source code programming statement with a predefined visual characteristic that indicates that the first source code programming statement complies with the first syntax.

6. The method of claim 1, further comprising:
receiving, via user input, a first source code programming statement of the some of the plurality of source code programming statements having the first syntax representative of the first programming language;
determining, upon entry of the first source code programming statement, that the first source code programming statement does not comply with either the first syntax or the second syntax; and
effecting display of the first source code programming statement with a predefined visual characteristic that indicates that the first source code programming statement does not comply with the first syntax or the second syntax.

7. The method of claim 1, wherein receiving the plurality of source code programming statements comprises receiving the plurality of source code programming statements via user input in a user interface window of an integrated development environment.

8. The method of claim 7, wherein the first syntax is different from the second syntax, and further comprising:
for each source code programming statement of the plurality of source code programming statements, syntactically verifying the each source code programming statement based on the first syntax or the second syntax.

9. The method of claim 1, wherein the object-oriented characteristics comprise inheritance, polymorphism, and encapsulation.

10. The method of claim 1, wherein the first programming language comprises Abbreviated Test Language for All Systems (ATLAS) and the second programming language comprises one of C++ and C#.

11. The method of claim 1, wherein the some of the plurality of source code programming statements having the first syntax representative of the first programming language do not comply with the second syntax and the some of the plurality of source code programming statements having the second syntax representative of the second programming language do not comply with the first syntax.

12. The method of claim 1, further comprising:
receiving, by the computing device, a translator identifier; and
wherein translating, by the computing device, the some of the plurality of source code programming statements having the first syntax representative of the first programming language into the new source code programming statements in the second programming language further comprises:
selecting, based on the translator identifier, a particular translator module from a plurality of translator modules; and
translating, by the particular translator module, the some of the plurality of source code programming statements having the first syntax representative of the first programming language into the new source code programming statements in the second programming language.

13. The method of claim 12, wherein each translator module of the plurality of translator modules generates different new source code programming statements in the second programming language.

14. The method of claim 13, wherein each translator module of the plurality of translator modules generates an interface configured to communicate with a particular unit under test of a plurality of units under test.

15. The method of claim 1, further comprising generating an executable file based on the source file.

16. A computing device, comprising:
a communication interface adapted to communicate with a network; and
a processor coupled to the communication interface, and configured to:
receive a plurality of source code programming statements, some of the plurality of source code programming statements having a first syntax representative of a first programming language and some of the plurality of source code programming statements having a second syntax representative of a second programming language, wherein the first programming language comprises a procedural programming language that lacks object-oriented characteristics and the second programming language comprises an object-oriented programming language that implements the object-oriented characteristics;
load a first language configuration file identifying syntax rules of the first programming language and second programming language instructions that correspond to first programming language instructions;
based on the first language configuration file, translate the some of the plurality of source code programming statements having the first syntax representative of the first programming language into new source code programming statements in the second programming language; and
generate a source file comprising the some of the plurality of source code programming statements having the second syntax representative of the second programming language and the new source code programming statements.

17. The computing device of claim 16, wherein the processor is further configured to:
receive, via user input, a first source code programming statement of the some of the plurality of source code programming statements having the first syntax representative of the first programming language;
determine, upon entry of the first source code programming statement, that the first source code programming statement does not comply with either the first syntax or the second syntax; and
effect display of the first source code programming statement with a predefined visual characteristic that indicates that the first source code programming statement does not comply with the first syntax or the second syntax.

18. A computer program product for integrating two programming languages, the computer program product stored on a non-transitory computer-readable storage medium and including instructions configured to cause a processor to carry out the steps of:
receiving a plurality of source code programming statements, some of the plurality of source code programming statements having a first syntax representative of a first programming language and some of the plurality of source code programming statements having a second syntax representative of a second programming language, wherein the first programming language comprises a procedural programming language that lacks object-oriented characteristics and the second programming language comprises an object-oriented programming language that implements the object-oriented characteristics;
loading a first language configuration file identifying syntax rules of the first programming language and second programming language instructions that correspond to first programming language instructions;
based on the first language configuration file, translating the some of the plurality of source code programming statements written in the first programming language into new source code programming statements in the second programming language; and
generating a source file comprising the some of the plurality of source code programming statements having the second syntax representative of the second programming language and the new source code programming statements.

* * * * *